United States Patent [19]

Reynhout et al.

[11] Patent Number: 4,605,526

[45] Date of Patent: Aug. 12, 1986

[54] PROCESS FOR PRODUCING DENSE MEMBRANES

[75] Inventors: Marinus J. Reynhout; Albert van der Scheer, both of Amsterdam, Netherlands

[73] Assignee: Shell Oil Company, Houston, Tex.

[21] Appl. No.: 694,739

[22] Filed: Jan. 25, 1985

[30] Foreign Application Priority Data

Oct. 15, 1984 [EP] European Pat. Off. ........ 84201486-2

[51] Int. Cl.$^4$ .............................................. B29C 67/20
[52] U.S. Cl. ...................................... 264/41; 55/522; 55/DIG. 13; 264/298
[58] Field of Search ............... 264/41, 298; 210/500.2; 55/158, 522, DIG. 5, DIG. 13

[56] References Cited

U.S. PATENT DOCUMENTS

| | | | |
|---|---|---|---|
| 3,385,916 | 5/1968 | Parrish et al. | 264/298 |
| 3,551,244 | 12/1970 | Forester et al. | 264/298 |
| 3,580,841 | 5/1971 | Cadotte et al. | 210/490 |
| 3,769,381 | 10/1973 | Konig et al. | 264/41 |
| 3,892,665 | 7/1975 | Steigelmann | 264/298 |
| 3,933,561 | 1/1976 | Larson et al. | 264/298 |
| 4,155,793 | 5/1979 | Salemme et al. | 264/298 |
| 4,279,855 | 7/1981 | Ward, III | 264/298 |
| 4,332,686 | 6/1982 | Gerlach et al. | 210/500.2 |
| 4,393,113 | 7/1983 | Sugie et al. | 264/298 |
| 4,406,673 | 9/1983 | Yamada et al. | 55/16 |
| 4,493,714 | 1/1985 | Ueda et al. | 55/158 |

*Primary Examiner*—James Lowe

[57] ABSTRACT

A process for producing dense membranes comprises allowing a solution comprising a polar polymer and/or a polar prepolymer in a polar solvent which is substantially soluble in a polar liquid to spread out over the surface of the polar liquid and allowing the spread out solution to desolvate. The dense membranes can be applied in supported membranes for use in gas separation processes.

11 Claims, No Drawings

PROCESS FOR PRODUCING DENSE MEMBRANES

FIELD OF THE INVENTION

The invention relates to a process for producing dense membranes and to (supported) dense membranes so produced.

BACKGROUND OF THE INVENTION

It is known to produce dense membranes by means of solvent casting which involves forming a solution of a polymer comprising a surface active agent and casting it onto a liquid support to produce a thin layer which is subsequently dried (by evaporation of the solvent present in the polymer solution) to form a solid, dense membrane. The applied solvent is, however, generally substantially immiscible with the liquid support in order to avoid a reduction of the surface tension of the liquid support wich could lead to instability of the developing membrane and possible generation of holes therein.

It would be advantageous to be able to use a solvent which is substantially soluble in the liquid support without simultaneous generation of undesired holes despite substantially reduced interfacial tension, thus shortening the membrane solidification time substantially because not all solvent would have to be removed from the membrane forming layer by means of evaporation.

Surprisingly, it has now been found that dense (that is non-porous) membranes can be produced, starting from a solution comprising a polar polymer and/or a polar prepolymer in a polar solvent which is substantially soluble in the polar liquid used as support.

SUMMARY OF THE INVENTION

Accordingly, the present invention provides a porcess for producing dense membranes, wherein a solution comprising a polar polymer and/or a polar prepolymer in a polar solvent which is substantially soluble in a polar liquid is allowed to spread out over the surface of the polar liquid and the spread out solution is allowed to desolvate.

It appears that a very low—or even completely absent—interfacial tension between the polar liquid support and the polar (pre)polymer solution allows the solution to spread out spontaneously over the surface of the liquid support without the need for a surface active agent, such as a dispersant, in the solution. Thus, it is now possible to produce membranes comprising said polymer in the absence of a surface active agent and even to use a liquid support in which a small amount of the solvent used is already present before the solution which comprises the solvent is spread out. A previous requirement for continuous refreshing of (part of) the liquid support (resulting in a disturbed surface of the support) is thereby eliminated.

DETAILED DESCRIPTION OF THE INVENTION

Advantageously a solution of a polar prepolymer is used in the present process, preferably in combination with a liquid support which effects cross-linking of the spread-out prepolymer, which makes it possible to produce selective, ultra-thin dense membranes for application in molecular separation processes. Suitable prepolymers comprise, in addition to carbon- and hydrogen atoms, nitrogen- and/or oxygen atoms, in particular in the form of ether-bridges. Such prepolymers can be obtained by reaction of a polyol, such as a polyether polyol and/or a polyamine, and/or a polyether amine with an isocyanate comprising at least two functional groups such as diphenyl methane diisocyanate or toluene diisocyanate. Preferred prepolymes are obtained by reaction of a polyether glycol with diphenyl methane diisocyanate; the polyether glycol suitably has a molecular weight of from 150–6000, preferably of from 400–2000.

Instead of a prepolymer it is also possible to use a homopolymer or copolymer which is reasonably soluble in a suitable polar solvent; in the present process a solution of a linear polyurethane can suitably be used.

The polar solvent may suitably be selected from organic compounds with from 1–10 carbon atoms and one or more hetero atoms which have at least a good solubility in the polar liquid support. Suitable organic compounds include ketones, of which methyl ethyl ketone is preferred because it possesses excellent desolvation (i.e. dissolution and evaporation) properties, in particular when used in combination with water as support liquid. It is also possible to use a polar solvent which additionally comprises a non-polar or less polar compound in order to match the degree of polarity of the (pre)polymer which is to be dissolved therein.

Preferred polar liquids which are used as support in the process according to the present invention are water and dilute aqueous solutions of salts which are most preferably substantially free of particulates which might adversely affect the formation of dense membranes. However, other polar liquids, such as glycerine may also be used.

The process according to the invention is suitably carried out at room temperature. Elevated temperatures (e.g. of from 30°–80° C.) are sometimes preferred in order to decrease the membrane solidification time; in other cases temperatures below room temperature are preferred; this can be attained by maintaining the liquid support at the desired temperature.

The (pre)polymer solution may be deposited continuously or batch-wise on the surface of the polar liquid support by known means, such as a pipette which is held close to the support surface in order not to disturb this surface. Once the (pre)polymer solution has spread out spontaneously over the support surface and a sufficiently thin liquid film has been formed, this film is allowed to solidify and to form a solid dense membrane. Before, during or, preferably, after the desolvation of the membrane film, the film is recovered from the liquid support surface by any suitable means. Preferably, the thus formed dense membrane according to the present invention is taken up on a permeable support which may comprise a layer of any suitable material, such as porous polypropylene, cloth and wire net. Porous polypropylene is preferred in view of the high porosity of this material. Alternatively, at least one layer can be applied between a selective, dense membrane film and the permeable support; this intermediate layer may itself be a dense, preferably highly permeable, film prepared according to the invention.

With the process according to the invention thin, hole-free membranes can be obtained with a high selectivity and an acceptable throughput (permeability) in molecular separation processes, such as gas purification. The thickness of such a membrane should preferably be less than about 0.1 $\mu$m in order to attain sufficient permeability, which is required for commercial application in processes such as the separation of carbon dioxide from methane or the separation of oxygen from nitrogen. In some cases it is possible to increase the permeability and/or the selectivity of dense membranes prepared according to the present invention by coating one surface of such membranes with a layer of a polar compound. Preferably such a layer comprises a polyether glycol and/or a polyether amine. In particular, dense polyurethane membranes obtained from prepolymers of polyether glycol and multiisocyanate (a mixture of isocyanates comprising two and more reactive groups), coated with a layer of a polyether glycol with a lower molecular weight than the polyether glycol used in the preparation of the prepolymer, show an increased permeability, compared with similar polyurethane membranes which are not coated with a layer of a polar compound.

The invention is further illustrated by the following Examples.

EXAMPLE 1

Preparation of dense (supported) membranes.

A dense polyurethane membrane A with a thickness of 0.05 μm was prepared by allowing a prepolymer solution in methyl ethyl ketone obtained by reaction of polyether glycol with a molecular weight of 400 with diphenyl methane diisocyanate to spread out over water spontaneously in the absence of a spreading agent. After spreading and desolvation the dense polyurethane membrane A thus obtained was transferred on to a highly permeable polydimethyl siloxane layer (supported by porous polypropylene) prepared according to British patent application No. 830797. The resultant three-layered supported dense membrane B was tested as described in Example 3.

Supported dense membrane C was prepared in substantially the same manner as membrane B, except that polyether glycol with a molecular weight of 2000 was used to prepare the polyurethane prepolymer.

EXAMPLE 2

Supported dense membrane D was prepared by coating the free side of the polyurethane layer of membrane C with polyether glycol having a molecular weight of 400.

EXAMPLE 3

Permeability and selectivity measurements.

The supported dense membranes B, C and D were tested at a gas pressure of 500 kPa (=5 bar abs.) on one side of the membrane and atmospheric permeate pressure on the other side of the membrane. The permeability for $CO_2$ and $CH_4$ of the membranes was measured; the results of these measurements are given in the normal form of P/l-values ($Nm^3.m^{-2}.day^{-1}.bar^{-1}$) in the following Table, in which also the selectivity, i.e. the ratio of the permeability for $CO_2$ and the permeability for $CH_4$, is given.

TABLE

| Experiment | Membrane | P/l for $CO_2$ | P/l for $CH_4$ | Selectivity |
|---|---|---|---|---|
| 1 | B | 0.3 | 0.01 | 30 |
| 2 | C | 4 | 0.15 | 27 |
| 3 | D | 6 | 0.22 | 27 |

From the results given in the Table it is clear that membranes with an excellent selectivity for the separation of $CO_2$ from a gas mixture of $CO_2$ and $CH_4$ can be prepared with the process according to the present invention.

It was found that the use of polyether glycol was a higher molecular weight (2000 for membrane C, compared with 400 for membrane B) in preparing the polyurethane prepolymer starting material provided a membrane (C) which showed a substantially increased permeability for $CO_2$, with only a slightly lower selectivity than was measured for supported membrane B.

By coating the free side of the polyurethane layer of supported membrance C with polyether glycol with a molecular weight of 400 the P/l-value for $CO_2$ was further increased without loss of selectivity (see the results of Experiment 3 for supported membrane D).

EXAMPLE 4

The selectivity of supported dense membrane B was furthermore measured for $O_2$ and $N_2$ in a similar manner as in Experiments 1-3 described in Example 3. The selectivity, expressed as the ratio of the permeability for $O_2$ and the permeability for $N_2$, was found to be 9.8 which is an excellent value for supported polymeric membranes.

What is claimed is:

1. A process for producing dense membranes, wherein a solution comprising a polar polymer and/or a polar prepolymer in a polar solvent which is substantially soluble in a polar liquid is allowed to spread out over the surface of the polar liquid and the spread out solution is allowed to desolvate.

2. The process according to claim 1 wherein a solution of a prepolymer is used.

3. The process according to claim 2 wherein the prepolymer is obtained by reaction of a polyol with an isocyanate comprising at least two functional groups.

4. The process according to claim 3 wherein the isocyanate is diphenyl methane diisocyanate.

5. The process according to claim 3 wherein the polyol is a polyether glycol.

6. The process according to claim 5 wherein the polyether glycol has a molar weight of from 150-6000.

7. The process according to claim 1 wherein a solution of a linear polyurethane is used.

8. The process according to claim 1 wherein the polar solvent comprises an organic compound with of from 1-10 carbon atoms and one or more hetero atoms.

9. The process according to claim 8 wherein the organic compound is a ketone.

10. The process according to claim 9 wherein the ketone is methyl ethyl ketone.

11. The process according to claim 1 wherein the polar liquid is water or an aqueous solution of a salt.

* * * * *